United States Patent
Tsumiyama et al.

(10) Patent No.: US 9,896,134 B2
(45) Date of Patent: Feb. 20, 2018

(54) UTILITY VEHICLE

(71) Applicant: KAWASAKI JUKOGYO KABUSHIKI KAISHA, Hyogo (JP)

(72) Inventors: Yoshinori Tsumiyama, Miki (JP); Takashi Hisamura, Kakogawa (JP); Chad Enger, Lincoln, NE (US)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 0 days.

(21) Appl. No.: 15/153,787

(22) Filed: May 13, 2016

(65) Prior Publication Data

US 2017/0327156 A1 Nov. 16, 2017

(51) Int. Cl.
*B62D 25/08* (2006.01)
*B60R 19/52* (2006.01)
*B60Q 1/04* (2006.01)
*B62D 25/16* (2006.01)

(52) U.S. Cl.
CPC ......... *B62D 25/085* (2013.01); *B60Q 1/0408* (2013.01); *B60R 19/52* (2013.01); *B62D 25/16* (2013.01)

(58) Field of Classification Search
CPC .... B62D 25/08; B62D 25/082; B62D 25/085; B60Q 1/0408; B60Q 1/0458; B60Q 1/0466; B60Q 1/0441; B60R 19/52
See application file for complete search history.

(56) References Cited

U.S. PATENT DOCUMENTS

| | | | |
|---|---|---|---|
| 5,106,148 A * | 4/1992 | Ikeda | B62D 25/084 296/203.02 |
| 8,720,975 B1 * | 5/2014 | Perez | B60Q 1/0491 296/187.04 |
| 8,827,357 B2 | 9/2014 | Kaku et al. | |
| 9,085,231 B2 * | 7/2015 | Yoshino | B60K 11/04 |
| 2005/0023864 A1 * | 2/2005 | Lazzeroni | B25B 27/0035 296/203.02 |
| 2011/0069506 A1 * | 3/2011 | Rinklin | B60Q 1/0416 362/523 |
| 2011/0115260 A1 * | 5/2011 | Mizuta | B62D 25/00 296/203.01 |
| 2011/0204680 A1 * | 8/2011 | Fortin | B60R 19/18 296/193.1 |
| 2012/0119543 A1 * | 5/2012 | Stedman | B62D 25/085 296/193.04 |
| 2013/0070471 A1 * | 3/2013 | Pickholz | B60Q 1/0408 362/520 |
| 2014/0062140 A1 * | 3/2014 | Townson | B62D 25/085 296/193.09 |
| 2014/0167454 A1 * | 6/2014 | Clapie | B62D 25/085 296/203.02 |
| 2014/0192549 A1 * | 7/2014 | Townson | B62D 25/085 362/548 |

(Continued)

*Primary Examiner* — Gregory Blankenship
(74) *Attorney, Agent, or Firm* — Wenderoth, Lind & Ponack, L.L.P.

(57) ABSTRACT

A utility vehicle includes a main frame, a front grille, and right and left headlight assemblies each provided between the front grille and a portion of the main frame facing the front grille in an anteroposterior direction of the utility vehicle, and including a front end attached to a rear side of the front grille and a rear end attached to the portion of the main frame.

4 Claims, 13 Drawing Sheets

(56) References Cited

U.S. PATENT DOCUMENTS

2014/0284966 A1* 9/2014 Maier .................. B62D 29/004
                                                      296/193.04
2016/0280058 A1* 9/2016 Uzaki .................. B62D 25/082
2016/0325790 A1* 11/2016 Murray ................. B62D 25/02
2016/0377254 A1* 12/2016 Thiel ................... B60Q 1/0041
                                                      362/511

* cited by examiner

UTILITY VEHICLE

BACKGROUND OF THE INVENTION

1. Technical Field

The present invention relates to a utility vehicle, and in particular relates to a headlight thereof.

2. Description of Related Art

There has been known a utility vehicle configured to travel on wild lands, as disclosed in U.S. Pat. No. 8,827,357.

A head light assembly of the utility vehicle configured to travel on wild lands is more likely to vibrate in comparison to a headlight assembly equipped on a vehicle configured to travel on paved roads. In particular, the headlight assembly may vibrate largely depending on how the headlight assembly is attached to a vehicle body. Such large vibration possibly breaks wiring of the headlight assembly. For example, vibration possibly disconnects between a connector of a headlamp in the headlight assembly and a connector of a harness.

SUMMARY

It is an object of the present invention to restrain vibration of a headlight assembly of a traveling utility vehicle.

In order to achieve the object mentioned above, according to an aspect of the present invention, there is provided a utility vehicle including:
a main frame;
a front grille; and
right and left headlight assemblies each provided between the front grille and a portion of the main frame facing the front grille in an anteroposterior direction of the utility vehicle, and including a front end attached to a rear side of the front grille and a rear end attached to the portion of the main frame.

According to the aspect, vibration of the headlight assembly is restrained while the utility vehicle is traveling.

DETAILED DESCRIPTION

According to an aspect of the present invention, a utility vehicle includes: a main frame; a front grille; and right and left headlight assemblies each provided between the front grille and a portion of the main frame facing the front grille in an anteroposterior direction of the utility vehicle, and including a front end attached to a rear side of the front grille and a rear end attached to the portion of the main frame.

For example, each of the right and left headlight assemblies is provided, at the rear end, with a convex portion extending in the anteroposterior direction of the utility vehicle, and the main frame has engagement holes engaging with the convex portions of the right and left headlight assemblies in the anteroposterior direction of the utility vehicle.

For example, each of the right and left headlight assemblies includes a headlamp and a headlamp housing having an opening at a front end thereof and accommodating the headlamp, and the headlamp housing has an edge of the opening attached to the front grille and a rear end attached to the main frame.

For example, the headlamp is an LED lamp provided with a cooling fin.

For example, the utility vehicle further includes: a hood attached to the main frame; and right and left fenders disposed on the right and the left of the hood and attached to the main frame; in which the front grille is attached to the hood, the right fender, and the left fender to be supported by the main frame.

An embodiment of the present invention will now be described in detail with reference to FIGS. 1 to 12. FIGS. 1 to 12 show a utility vehicle according to an embodiment of the present invention.

Unnecessarily detailed description may not be made where appropriate. For example, an already well known matter may not be described in detail or substantially identical configurations may not be described repeatedly. It is for preventing the following description from becoming unnecessarily long as well as for allowing those skilled in the art to easily understand the description.

The inventors provide the accompanying drawings and the following description in order to allow those skilled in the art to fully understand the present disclosure, and do not intend to limit a subject matter recited in the patent claims.

Directions of "front", "rear", "left", and "right" mentioned herein are viewed from a driver boarding and driving the utility vehicle.

Figure 1:
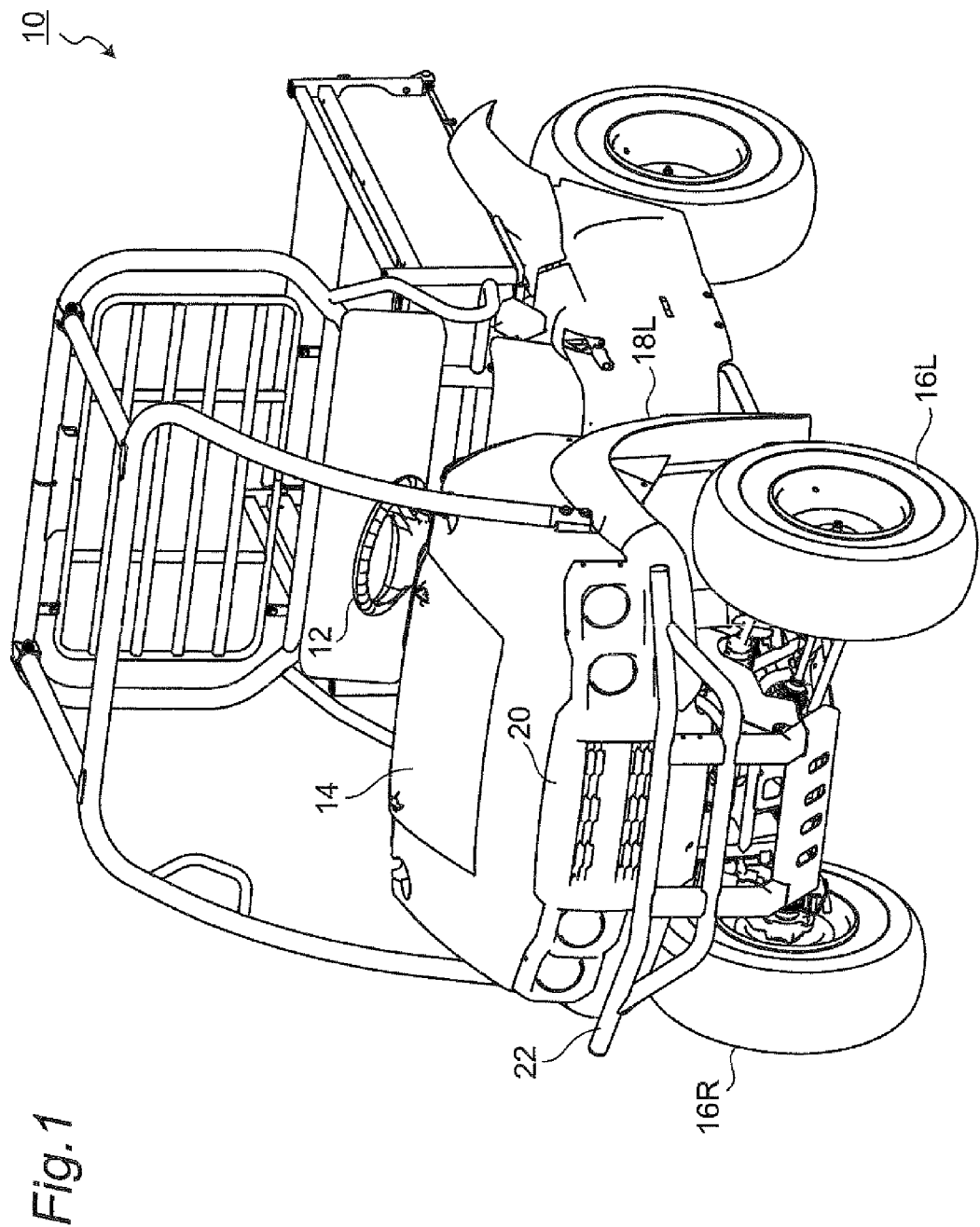
FIG. 1 is a perspective view of a utility vehicle according to an aspect of the present invention.
Figure 2:
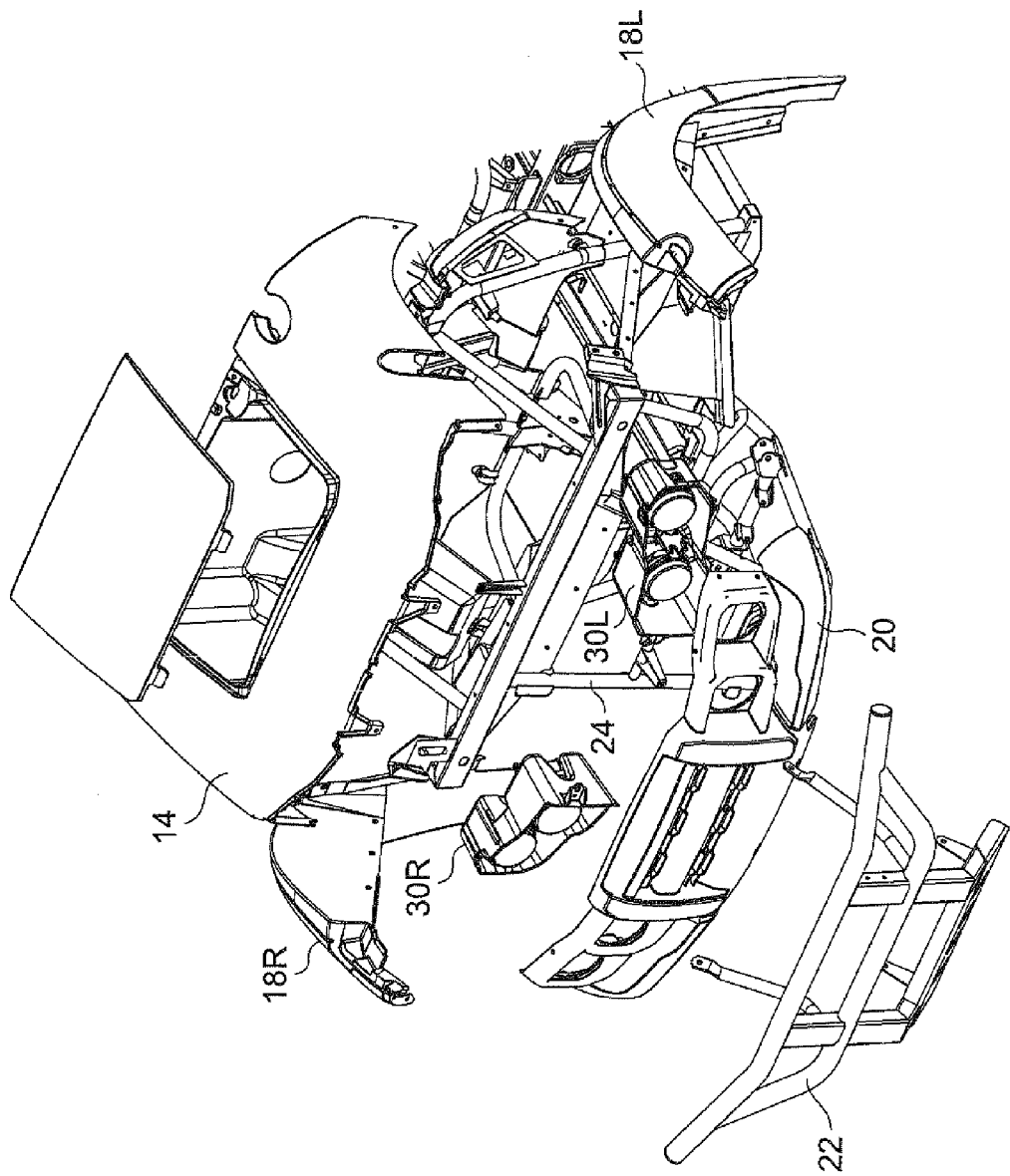
FIG. 2 is an exploded perspective view of a front portion of the utility vehicle.
Figure 3:
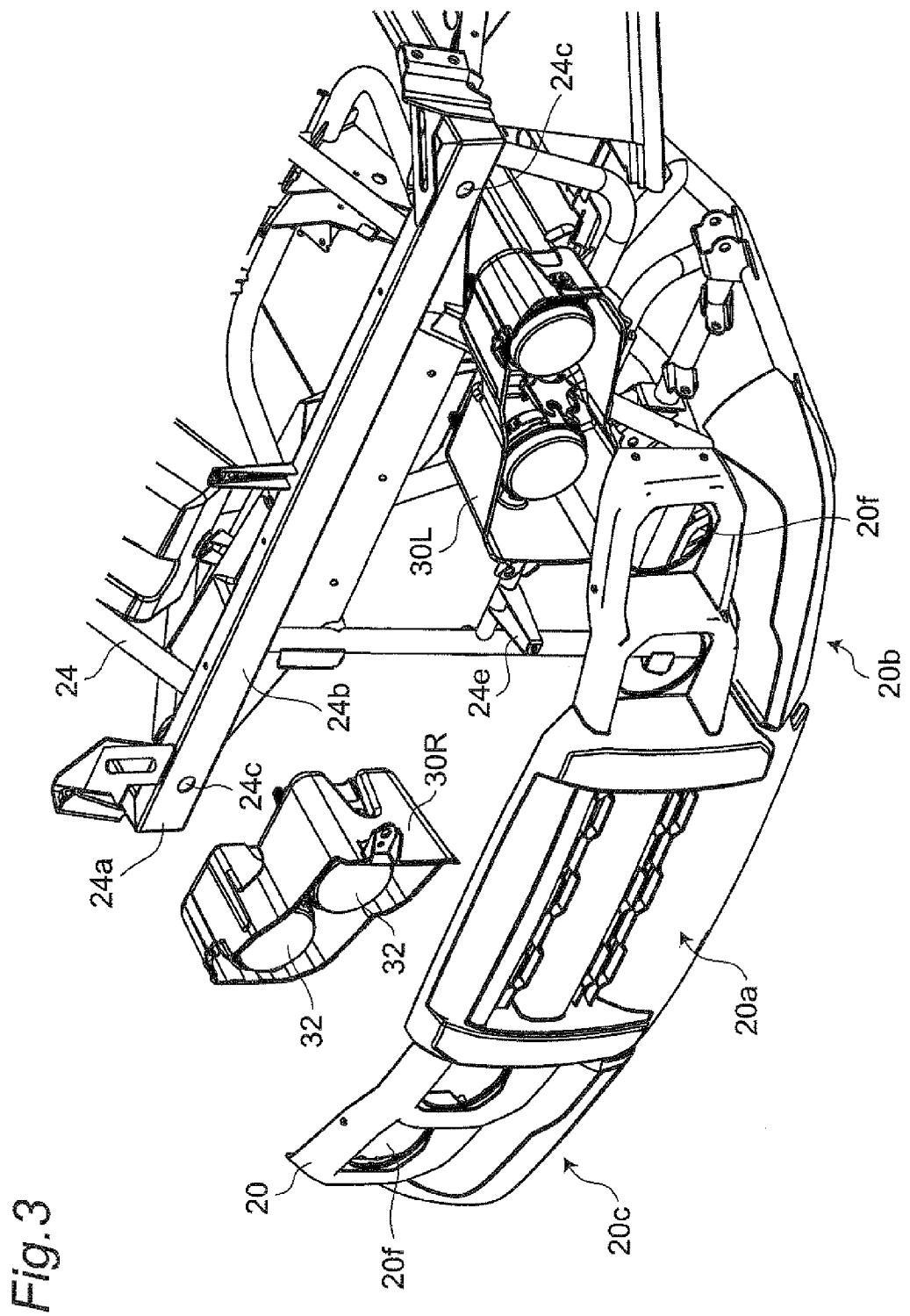
FIG. 3 is an exploded perspective view showing a layout of headlight assemblies, a front grille, and a main frame.

As shown in FIGS. 1 to 3, a utility vehicle 10 includes a hood 14 provided ahead of a steering wheel 12 manipulated by the driver, a left fender 18L provided on the left of the hood 14 and covering a left front wheel 16L, a right fender 18R provided on the right of the hood 14 and covering a right front wheel 16R, a front grille 20 serving as a front cover provided ahead of the hood 14 and including a grille portion located at the center in the vehicle width direction, and a bumper 22 provided ahead of the front grille 20.

The hood 14, the left fender 18L, the right fender 18R, and the bumper 22 are attached to a main frame 24 of the utility vehicle 10. The front grille 20 has an upper edge attached to the front end of the hood 14, a left edge attached to the front end of the left fender 18L, and a right edge attached to the front end of the right fender 18R.

The front grille 20 is provided, therebehind (i.e. on a rear side of the front grille 20), or below the hood 14, with a left headlight assembly 30L and a right headlight assembly 30R.

The left headlight assembly 30L and the right headlight assembly 30R are configured substantially identically with each other except that they are symmetric with respect to each other. The left headlight assembly 30L will thus mainly be described below.

Figure 4:
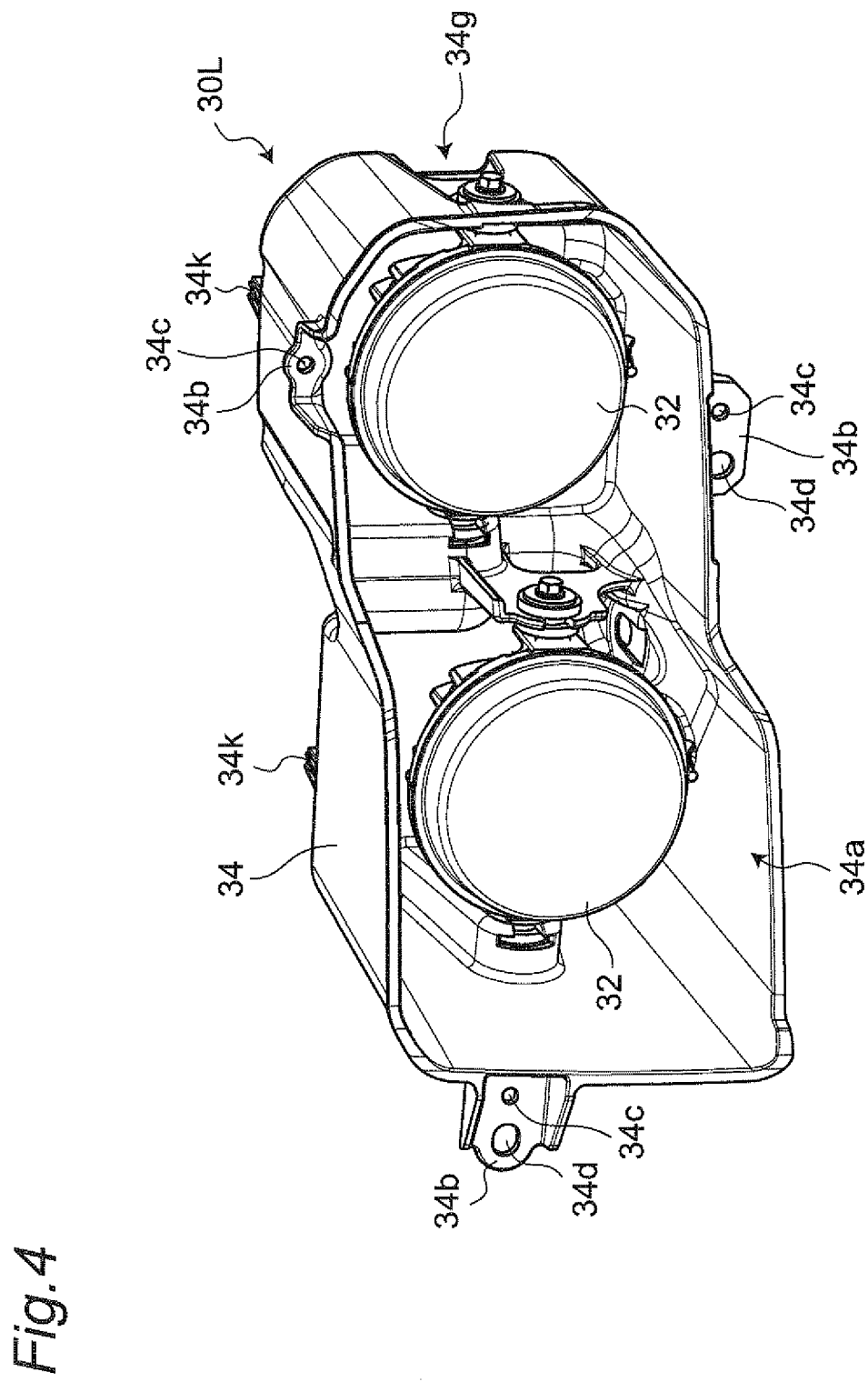
FIG. 4 is a perspective view of a front side of a left headlight assembly.
Figure 5:
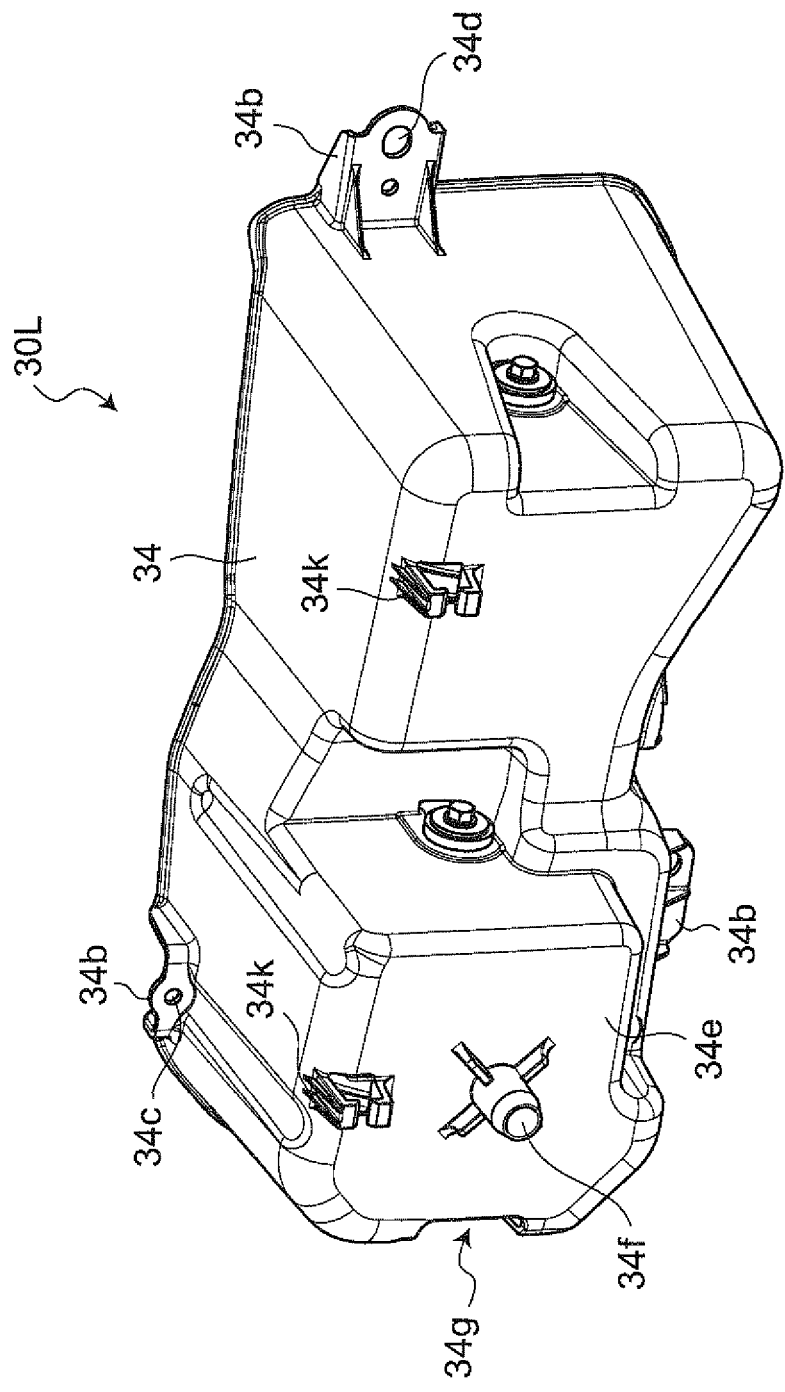
FIG. 5 is a perspective view of a rear side of the left headlight assembly.

The headlight assembly 30L is shown in FIGS. 4 and 5. FIG. 4 shows the left headlight assembly 30L viewed from ahead of the utility vehicle 10, in other words, viewed from the position of the front grille 20. FIG. 5 shows a rear side of the headlight assembly 30L.

In the embodiment, the headlight assembly 30L shown in FIGS. 4 and 5 includes headlamps 32 and a headlamp housing 34 accommodating the headlamps 32. The headlamp housing 34 accommodates the two headlamps 32 aligned in a left-right direction such that the headlamp 32 close to the outer end of the vehicle body is located behind the headlamp 32 close to the center of the vehicle body. The headlamps 32 are accommodated in and thus protected by the headlamp housing 34.

The headlamp housing 34 is made of a plastic material or the like and has a box shape provided with an opening 34a at the front end thereof (at the end facing the front grille 20). The opening 34a is provided, on its edge, with three attachment tabs 34b configured to attach the headlight assembly 30L to a rear side of a left portion (a left portion with respect to a center grille portion 20a) 20b of the front grille 20.

The three attachment tabs 34b are each provided with a through hole 34c allowing a screw 36 (see FIG. 7) to penetrate. Two of the attachment tabs 34b are each provided with a positioning hole 34d configured to position the headlight assembly 30L with respect to the front grille 20.

Figure 6:
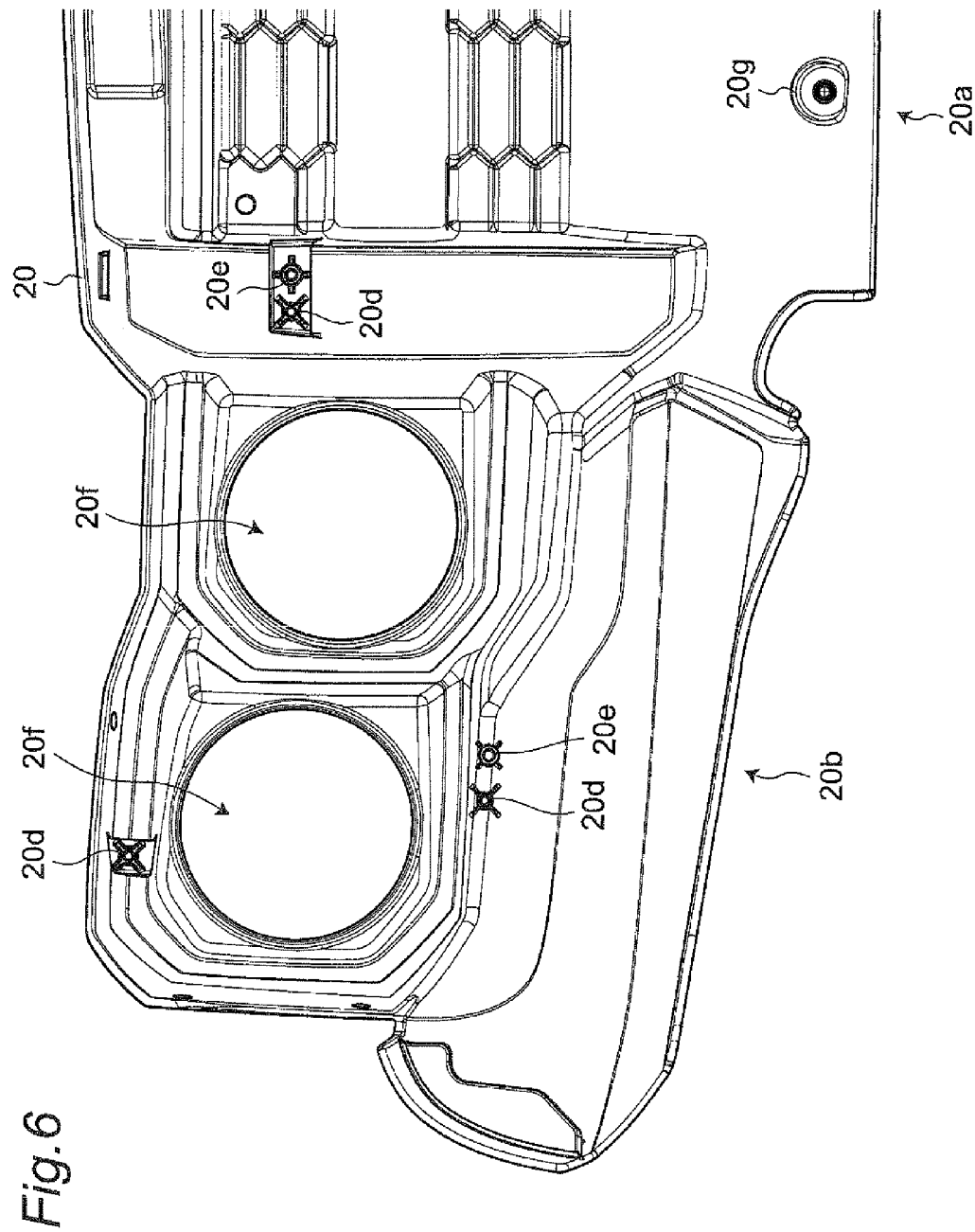
FIG. 6 is a view of a rear portion of the front grille configured to receive the left headlight assembly.

As shown in FIG. 6, the back side (rear side) of the left portion 20b of the front grille 20, to which an open edge of the headlight assembly 30L is attached, is provided with three female screw holes 20d and two positioning pins 20e.

Figure 7:
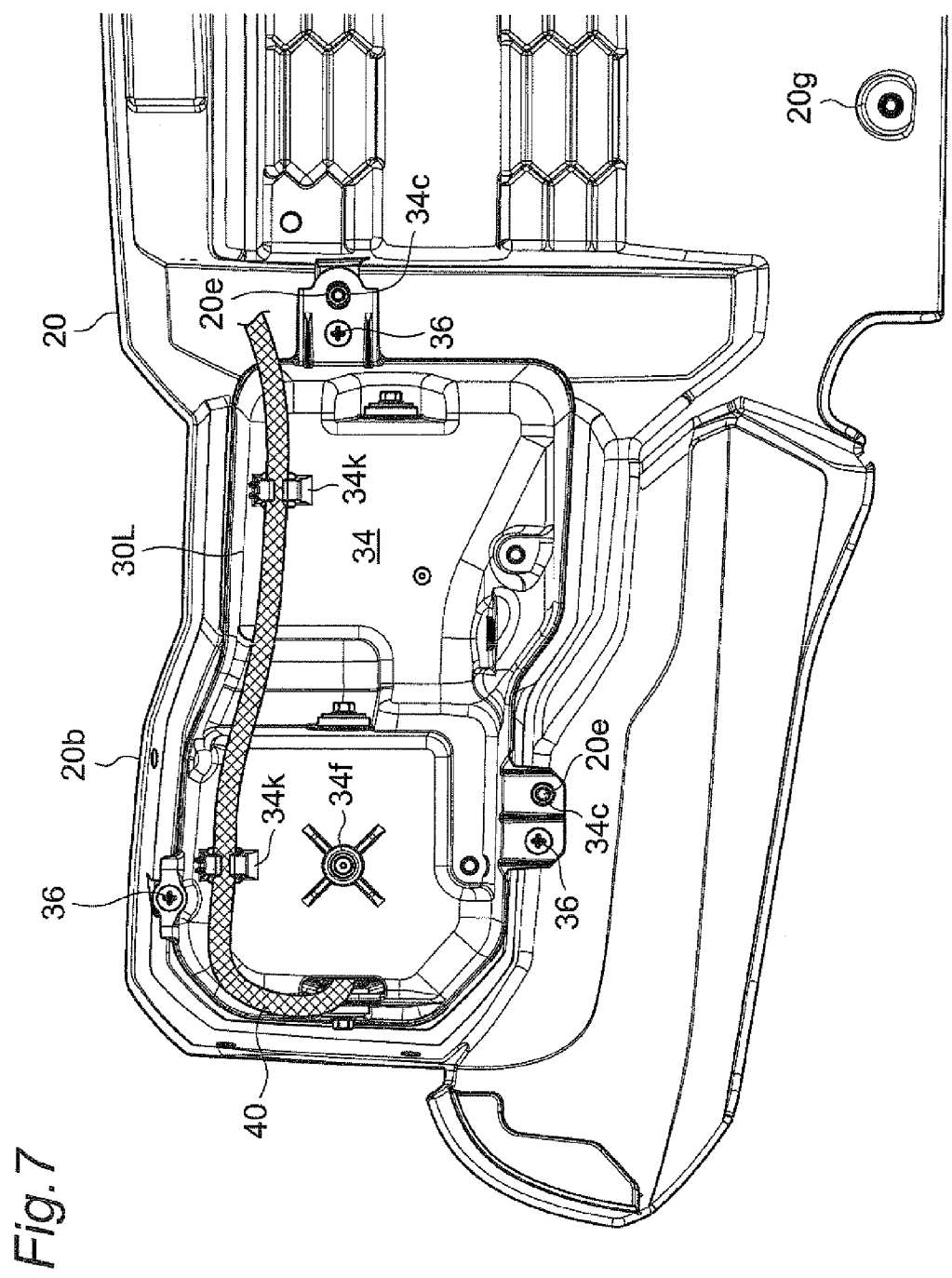
FIG. 7 is a view of the rear portion of the front grille to which the left headlight assembly is attached.

As shown in FIG. 7, the positioning pins 20e of the front grille 20 are inserted correspondingly through the two positioning holes 34d of the headlamp housing 34, so that the headlight assembly 30L is positioned with respect to the front grille 20. The screws 36 penetrating the three through holes 34c of the headlamp housing 34 engage correspondingly with the female screw holes 20d of the front grille 20, so that the headlight assembly 30L is fixed to the rear side of the front grille 20.

The front end (the opening end) of the headlight assembly 30L is attached to the front grille 20 as described above, so that the two headlamps 32 of the headlight assembly 30L are positioned correspondingly with respect to through holes 20f provided in the left portion 20b of the front grille 20. The headlamps 32 are thus disposed to emit light forward through the through holes 20f of the front grille 20, i.e. in a forward travel direction of the utility vehicle 10.

As shown in FIG. 7, the left headlight assembly 30L attached to the left portion 20b of the front grille 20 is cantilever supported. Specifically, the front end (open edge) of the headlight assembly 30L is supported by the front grille 20. The right headlight assembly 30R is similarly cantilever-supported by a right portion 20c of the front grille 20.

Therefore, the headlight assemblies 30L and 30R possibly vibrate largely while the utility vehicle 10 is traveling. The headlight assemblies 30L and 30R possibly vibrate largely to be detached from the front grille 20 particularly in a case where the utility vehicle 10 is traveling on wild lands. Otherwise, the headlight assembly 30L or 30R possibly has broken wiring. Furthermore, large vibration of the headlight assemblies 30L and 30R possibly damages the front grille 20. If the front grille 20 is improved in rigidity in order to prevent these defects, the front grille 20 is increased in weight. This will lead to increase in weight of the utility vehicle 10.

Figure 8:
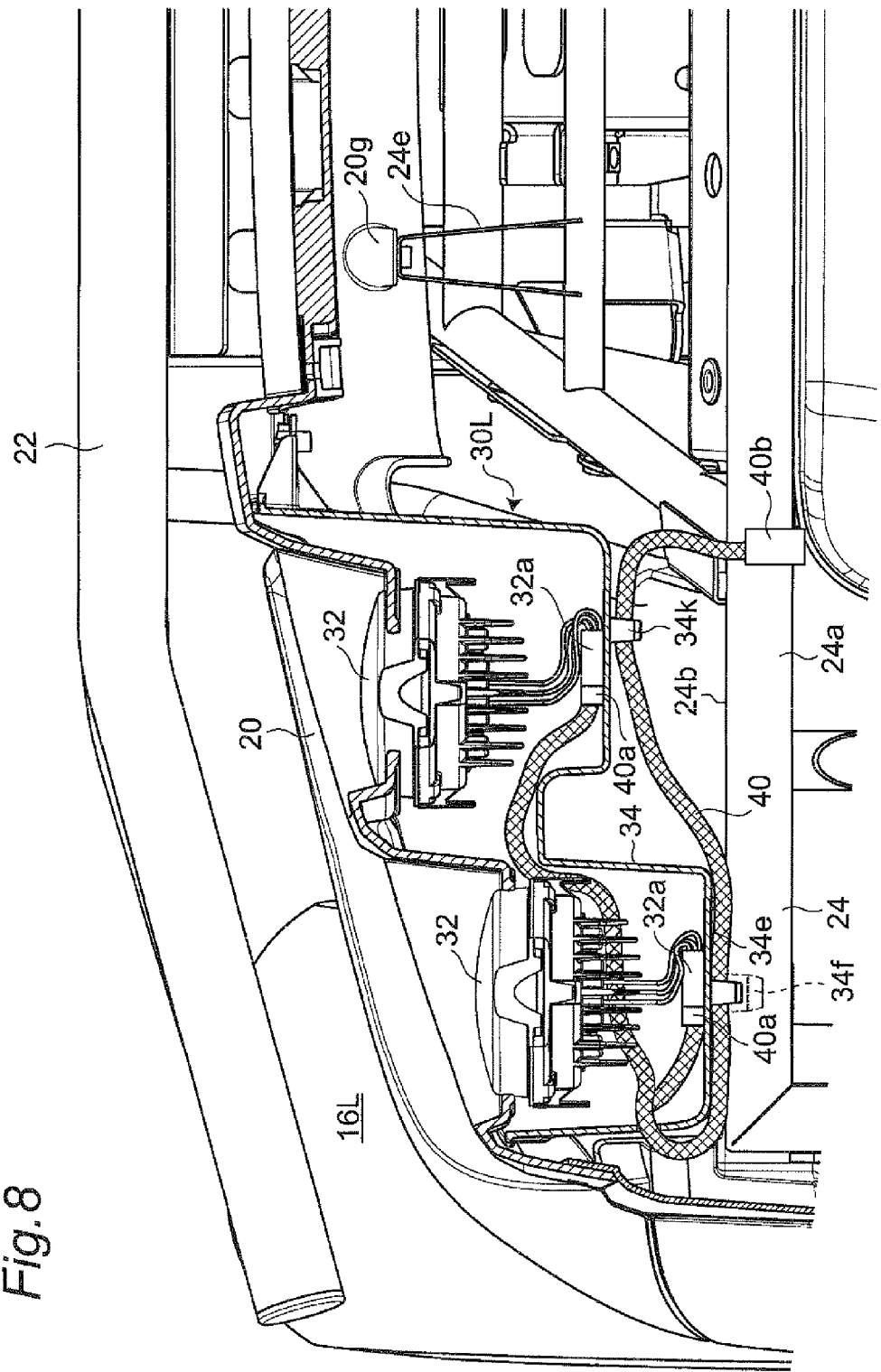
FIG. 8 is a top view partially showing a section of the left headlight assembly that is attached between the front grille and a front beam of the main frame.

As shown in FIG. 8, the rear end of the headlight assembly 30L (i.e. the rear end of the headlamp housing 34) is fixed to the main frame 24 in the embodiment. The rear end of the headlight assembly 30R is similarly fixed to the main frame 24.

Specifically, as shown in FIG. 3, a front beam 24a as part of the main frame 24 is provided behind the front grille 20. The front beam 24a extends in the vehicle width direction (left-right direction) of the utility vehicle 10.

The headlight assembly 30L is disposed between the front grille 20 and the front beam 24a that face each other in the anteroposterior direction of the utility vehicle 10. The rear end of the headlight assembly 30L is fixed to the front beam 24a in this state.

In the embodiment, as shown in FIG. 5, the headlamp housing 34 of the headlight assembly 30L has a rear surface (the surface opposite to the front beam 24a) 34e that is provided with a convex portion 34f extending in the anteroposterior direction of the utility vehicle 10. As shown in FIG. 3, the front beam 24a has a surface 24b that is opposite to the headlight assembly 30L and is provided with an engagement hole 24c opened in the anteroposterior direction of the utility vehicle 10.

The convex portion 34f of the headlamp housing 34 engages with the engagement hole 24c of the front beam 24a so as to enter the front beam 24a as shown in FIG. 8. The rear surface 34e of the headlamp housing 34, i.e. the rear end of the headlight assembly 30L, is thus fixed to the front beam 24a.

In this configuration, the rear end of the headlight assembly 30L is restrained from vibrating in the left-right direction and in the vertical direction while the utility vehicle 10 is traveling.

Accordingly, the front end of the headlight assembly 30L is fixed to the front grille 20 whereas the rear end thereof is fixed to the front beam 24a. Vibration of the headlight assembly 30L is restrained more effectively in this configuration while the utility vehicle 10 is traveling in comparison to the case where the headlight assembly 30L is cantilever supported by the front grille 20.

Use of the front beam 24a as part of the main frame 24 requires no separate member that is configured to restrain vibration of the headlight assembly 30L and that will cause increase in weight of the utility vehicle 10.

The headlight assembly 30L (similarly the headlight assembly 30R) is fixed to the front beam 24a of the main frame 24 in the embodiment, so that the front grille 20 and the main frame 24 are provided more integrally with each other.

The upper edge, the left edge, and the right edge of the front grille 20 are attached to the hood 14, the left fender 18L, and the right fender 18R, respectively, which are attached to the main frame 24. As shown in FIGS. 7 and 8, the front grille 20 is provided, at a lower portion on the rear side, with a boss 20g that is attached to a front grille support 24e of the main frame 24. Moreover, the front grille 20 is attached to the main frame 24 via the headlight assemblies 30L and 30R. In comparison to a case where the rear ends of the headlight assemblies 30L and 30R are not fixed to the front beam 24a of the main frame 24, the front grille 20 and the main frame 24 are provided more integrally with each other and deformation of the front grille 20 is restrained while the utility vehicle 10 is traveling. This configuration restrains vibration of the headlight assemblies 30L and 30R fixed to the front grille 20.

This configuration in the embodiment further facilitates attachment of the front grille 20. Specifically, as shown in FIG. 7, the headlight assembly 30L (similarly the headlight assembly 30R) is initially attached to the front grille 20. The convex portions 34f of the headlight assemblies 30L and 30R are subsequently inserted to the engagement holes 24c of the front beam 24a of the main frame 24, so that the front grille 20 is temporarily fixed to the main frame 24. This temporary fixing allows the front grille 20 to be easily fixed to the hood 14, the left fender 18L, the right fender 18R, and the front grille support 24e of the main frame 24.

Figure 9:
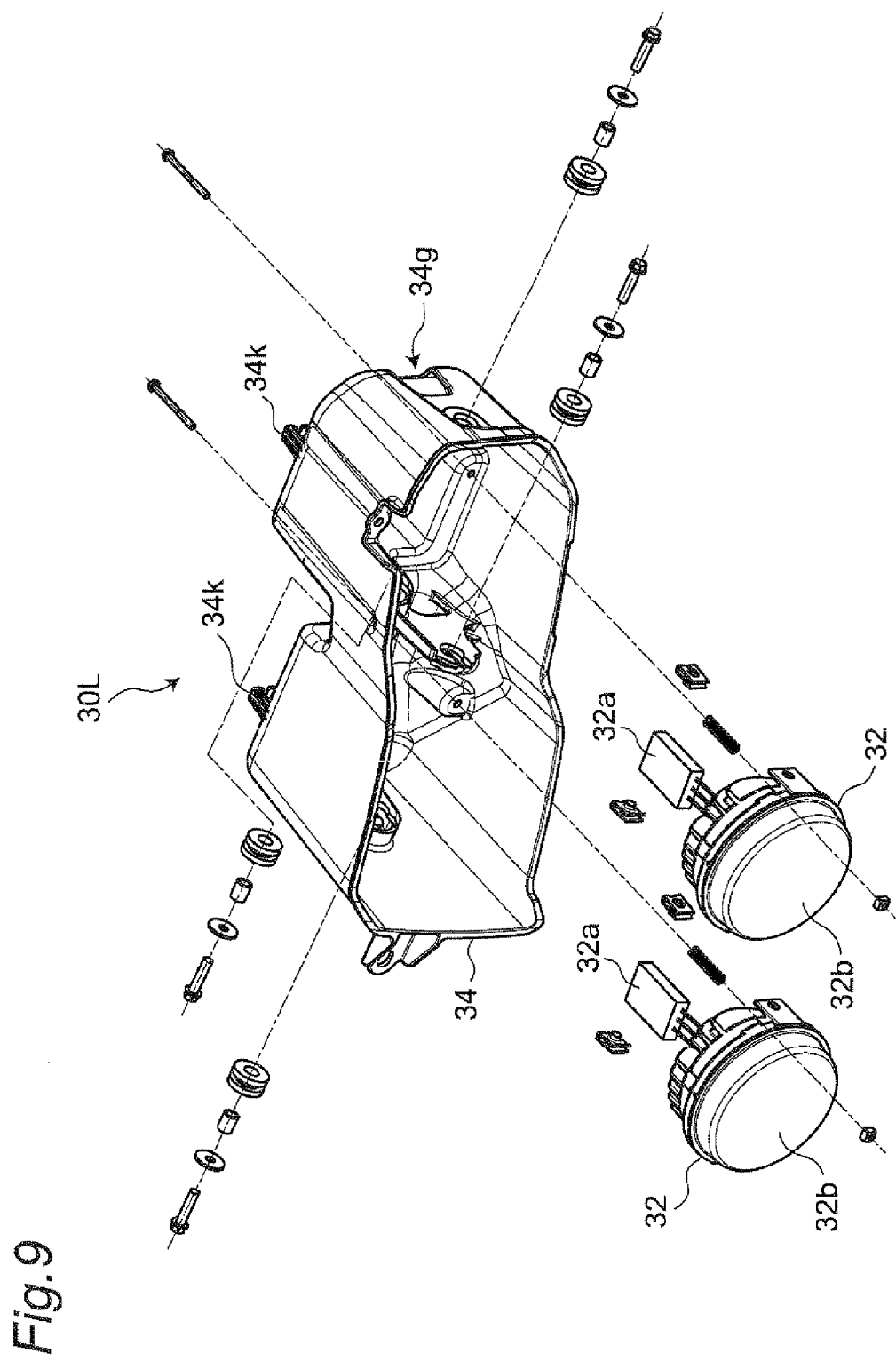
FIG. 9 is an exploded perspective view of the left headlight assembly.
Figure 10:
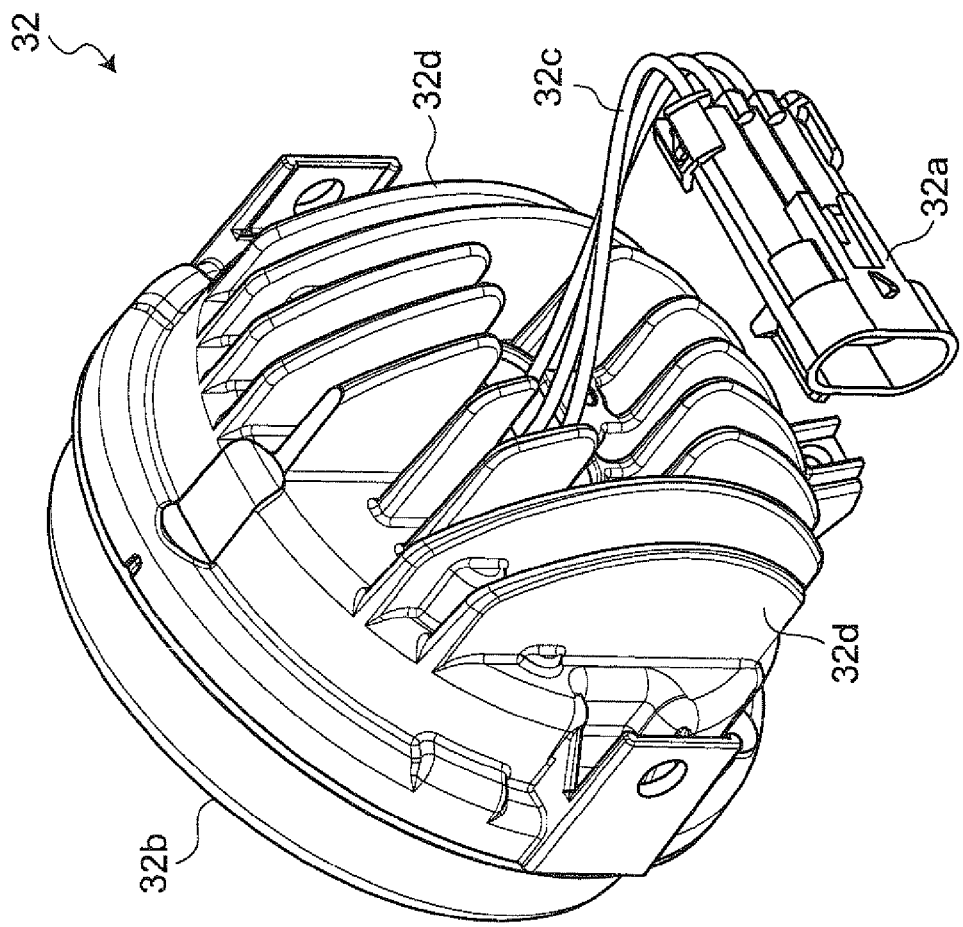
FIG. 10 is a perspective view of a rear side of a headlamp.

FIG. 9 is an exploded perspective view of the headlight assembly 30L. FIG. 10 is a perspective view of a rear side of the headlamp 32.

The headlamp 32 in the embodiment is an LED lamp provided therein with a light emitting diode (LED) (not shown), and includes a headlamp connector (first connector) 32a configured to receive driving electric power of the LED. The headlamp connector 32a is provided at a distal end of cable 32c extending from a rear side (opposite to a cover 32b allowing transmission of light emitted from the LED) of the headlamp 32. The headlamp 32 is also provided, on the rear side, with a plurality of cooling fins 32d configured to cool the LED. The cooling fins 32d are made of aluminum or the like.

Adoption of the LED lamps as the headlamps 32 achieves long service lives of the headlight assemblies 30L and 30R. The headlamps 32 provided with the cooling fins 32d configured to cool the LEDs will further prolong the service lives of the LEDs.

The headlamps 32 provided with the cooling fins 32d are increased in weight, so that the headlight assemblies 30L and 30R will be more likely to vibrate. However, the vibration is restrained because the front ends of the headlight assemblies 30L and 30R are attached to the front grille 20 and the rear ends thereof are fixed to the main frame 24.

As shown in FIGS. 7 and 8, the headlamp connector 32a of each of the headlamps 32 is detachably connected to a harness connector (second connector) 40a that is provided at a first end of a harness 40 configured to supply the headlamp 32 with electric power. The harness 40 has a second end connected to a controller (not shown) configured to control lighting of the headlamps 32.

In the embodiment, as shown in FIG. 8, the headlamp connector 32a and the harness connector 40a are connected with each other in the headlamp housing 34. As shown in FIG. 9, the headlamp housing 34 is provided with a through hole 34g allowing the harness connector 40a to penetrate.

As shown in FIG. 8, the headlamp connector 32a and the harness connector 40a connected with each other in the headlamp housing 34 are held by (fixed to) the headlamp housing 34.

The headlamp housing 34 holds the headlamp connector 32a of the headlamp 32 and the harness connector 40a of the harness 40 connected with each other in order to avoid unintended disconnection therebetween while the utility vehicle 10 is traveling.

Specifically, if the headlamp connector 32a and the harness connector 40a connected with each other are not fixed, the headlamp connector 32a and the harness connector 40a will move freely to possibly collide with peripheral members to cause disconnection between the connectors while the utility vehicle 10 is traveling particularly on wild lands.

Figure 11:
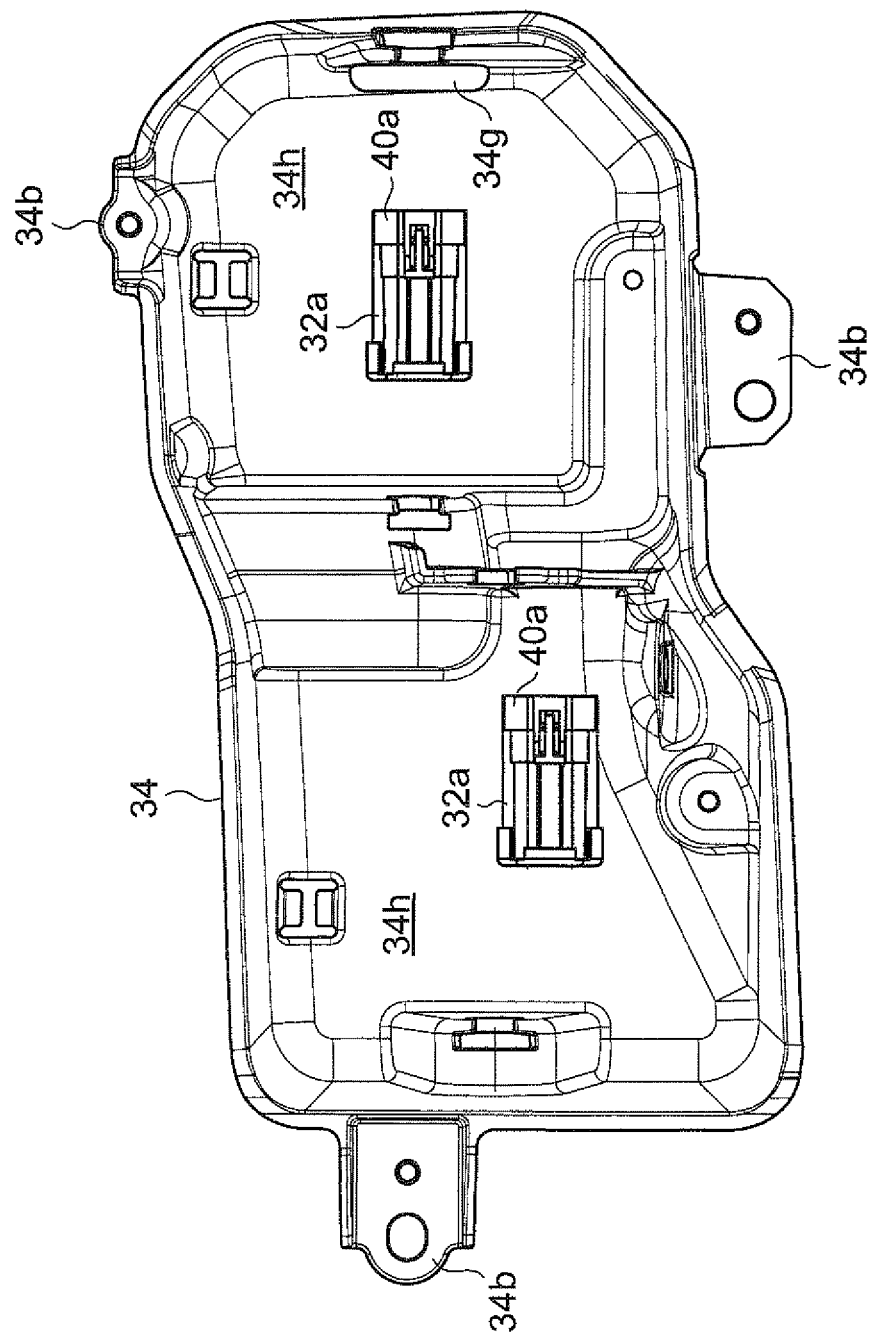
FIG. 11 is a front view of a headlamp housing of the left headlight assembly, to which headlamp connectors and harness connectors are attached.
Figure 12:
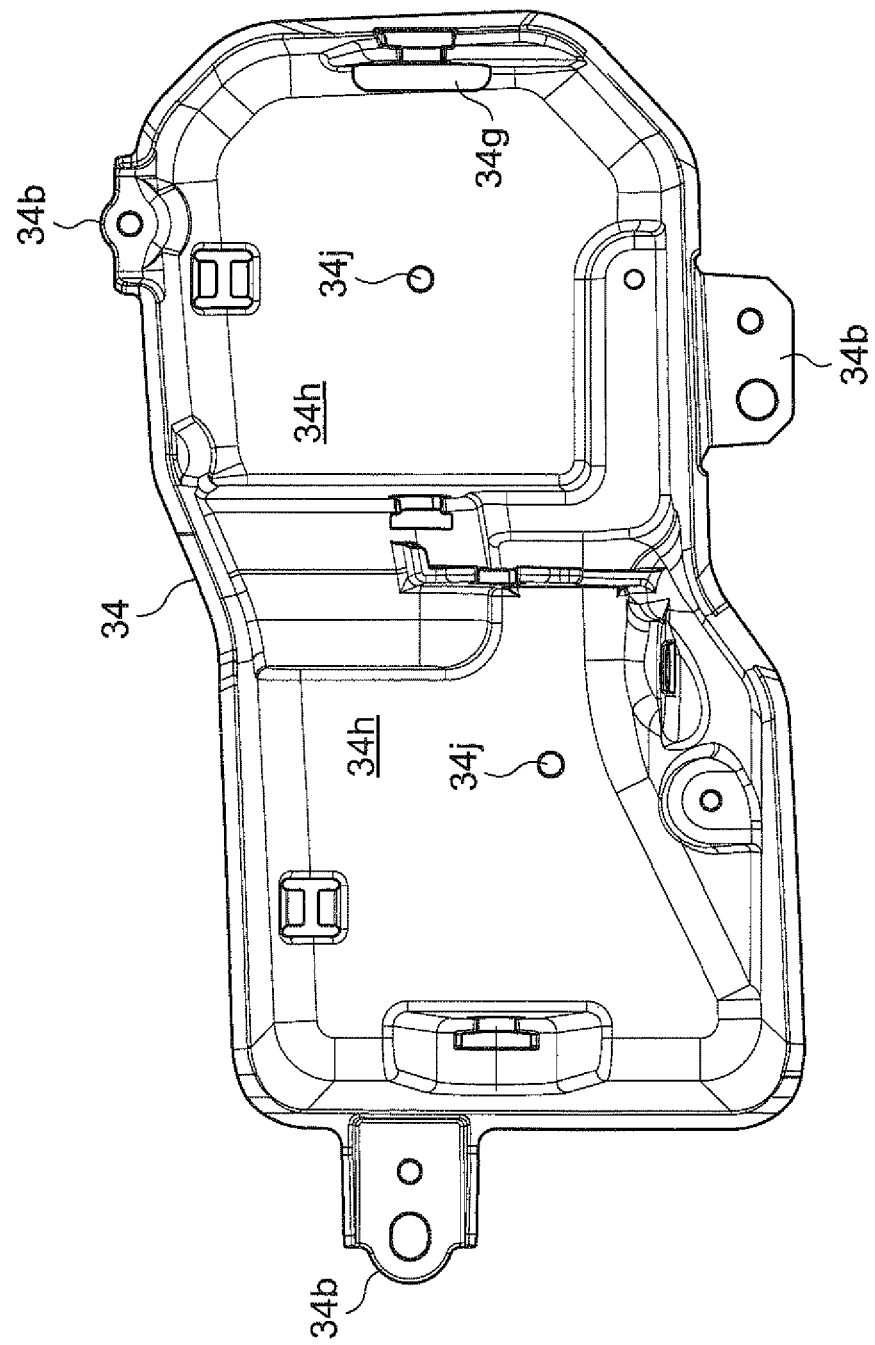
FIG. 12 is a front view of the headlamp housing of the left headlight assembly, from which the headlamp connectors and the harness connectors are detached.
Figure 13:
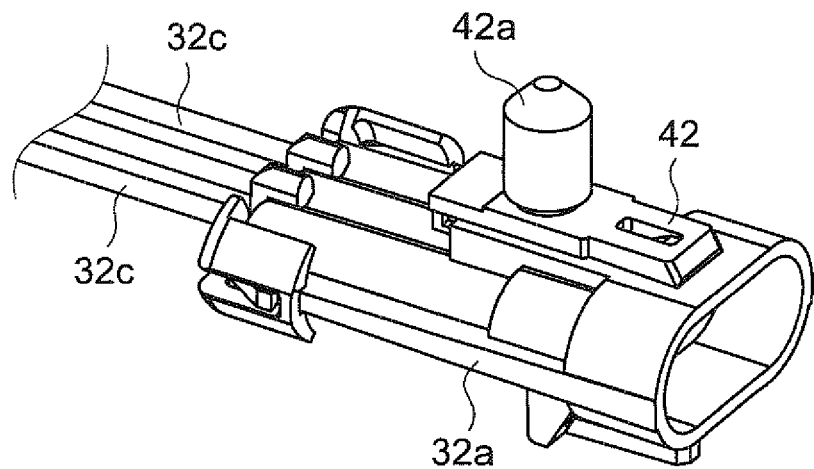
FIG. 13 is a perspective view of the headlamp connector to which a connector holder is attached.
Figure 14:
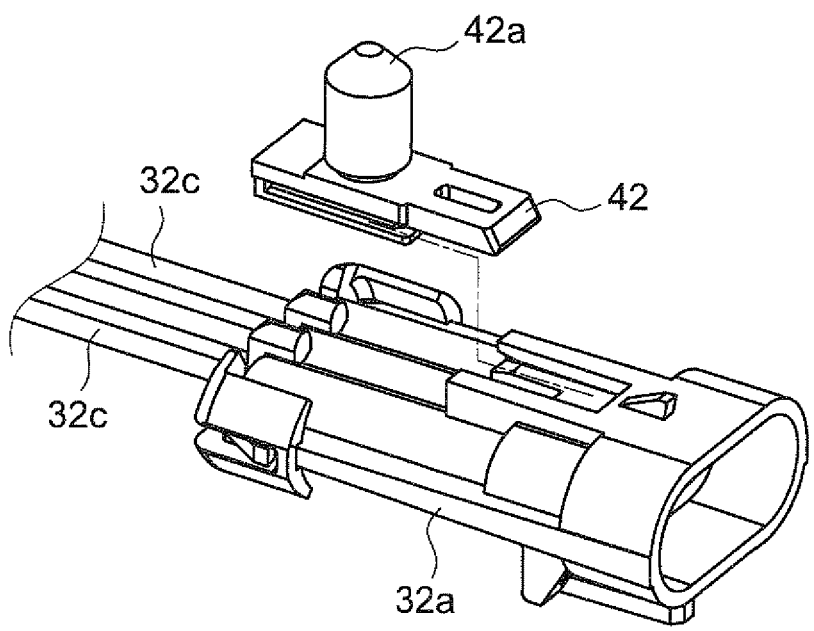
FIG. 14 is a perspective view of the headlamp connector from which the connector holder is detached.

In the embodiment, as shown in FIG. 11, the headlamp connector 32a of the headlamp 32 and the harness connector 40a of the harness 40 connected with each other are attached to a far surface 34h of each inner space of the headlamp housing 34 (i.e. a surface behind the headlamp 32). As shown in FIG. 12, the far surfaces 34h of the headlamp housing 34 are each provided with an engagement hole 34j for the attachment. As shown in FIG. 13, the headlamp connector 32a is provided with an engagement pin 42a rotatably engaging with the engagement hole 34j of the headlamp housing 34. Specifically, as shown in FIG. 14, the engagement pin 42a in the embodiment is provided on a connector holder 42 holding the headlamp connector 32a (attached to the headlamp connector 32a) of the headlamp 32. The engagement hole 34j and the engagement pin 42a (the connector holder 42) serve as a connector holding portion of the headlamp housing 34 holding the headlamp connector 32a and the harness connector 40a.

The engagement pin 42a of the connector holder 42 holding the headlamp connector 32a of the headlamp 32 shown in FIG. 13 engages with each of the engagement holes 34j of the headlamp housing 34 shown in FIG. 12. In other words, the engagement holes 34j serve as holder holding portions each holding the connector holder 42. Each of the engagement holes 34j holds the connector holder 42, so that the headlamp connector 32a and the harness connector 40a connected with each other are fixed to the headlamp housing 34. In this configuration, the headlamp connector 32a and the harness connector 40a connected with each other do not move freely and keep the connection while the utility vehicle 10 is traveling.

The engagement pin 42a of the connector holder 42 rotatably engages with the engagement hole 34j of the headlamp housing 34, so that the headlamp connector 32a and the harness connector 40a connected with each other have a plurality of different postures with respect to the headlamp housing 34. The cable 32c of the headlamp 32 and the harness 40 are thus enhanced in layout flexibility in the headlamp housing 34.

As shown in FIG. 7, the headlamp housing 34 is provided with clamps 34k holding the harness 40. The clamps 34k hold the harness 40 outside the headlamp housing 34 and limit free movement of the harness 40 while the utility vehicle 10 is traveling. This configuration restrains disengagement between the engagement pin 42a of the connector holder 42 and the engagement hole 34j of the headlamp housing 34 possibly caused by free movement of the harness 40.

According to the embodiment, vibration of the headlight assemblies 30L and 30R is restrained while the utility vehicle 10 is traveling.

The headlamps of the headlight assemblies are LED lamps in the embodiment described above. However, the present invention is not limited to this case. Halogen lamps or the like are applicable as the headlamps.

In the above embodiment, the convex portions 34f of the headlight assemblies 30L and 30R (the headlamp housings 34) engage with the engagement holes 24c of the main frame 24 (the front beam 24a), so that the rear ends of the headlight assemblies 30L and 30R are fixed to the main frame 24. How the rear ends of the headlight assemblies are fixed to the main frame is not limited to that of the above embodiment. Alternatively, the main frame is provided with convex portions whereas the headlight assemblies are each provided, at the rear end, with an engagement hole engaging with the convex portion.

The embodiment described above exemplifies the technique of the present invention. The accompanying drawings and the detailed description are provided herein for the exemplification. Those constituent elements shown in the accompanying drawings and described in the detailed description will include constituent elements essential for achievement of the object as well as constituent elements not essential for achievement of the object but for exemplification of the technique. Accordingly, those inessential constituent elements should not be regarded as being essential simply because those inessential constituent elements are shown in the accompanying drawings or described in the detailed description.

The above embodiment is provided for exemplification of the technique according to the present invention, and will thus accept modification, replacement, addition, removal and the like in various manners within the scope of the patent claims or an equivalent scope.

The invention claimed is:

1. A utility vehicle comprising:
a main frame;
a front grille including through holes; and
right and left headlight assemblies each provided between the front grille and a portion of the main frame facing the front grille in an anteroposterior direction of the utility vehicle, including a front end attached to a rear side of the front grille and a rear end attached to the portion of the main frame, and including a headlamp positioned with respect to the through hole of the front grille to emit light forward through the through hole,
wherein each of the right and left headlight assemblies is provided, at the rear end, with a convex portion extending in the anteroposterior direction of the utility vehicle,
the main frame has engagement holes engaging with the convex portions of the right and left headlight assemblies in the anteroposterior direction of the utility vehicle, and
the convex portions of the right and left headlight assemblies and the engagement holes of the main frame are configured to temporarily-fix the front grille, which the right and left head light assemblies are attached to, on the main frame.

2. The utility vehicle according to claim 1, wherein
each of the right and left headlight assemblies includes a headlamp housing having an opening at its front end and accommodating the headlamp, and
the headlamp housing has an edge of the opening attached to the front grille and a rear end attached to the main frame.

3. The utility vehicle according to claim 1, wherein the headlamp is an LED lamp provided with a cooling fin.

4. The utility vehicle according to claim 1, further comprising:
a hood attached to the main frame; and
right and left fenders disposed on the right and the left of the hood and attached to the main frame; wherein
the front grille is attached to the hood, the right fender, and the left fender to be supported by the main frame.

* * * * *